United States Patent
Kim et al.

(10) Patent No.: US 9,344,194 B2
(45) Date of Patent: May 17, 2016

(54) SYSTEM AND METHOD FOR MONITORING AND CONTROL OF AN OPTICAL MODULATOR FOR AN M-QAM TRANSMITTER

(71) Applicant: Fujitsu Limited, Kawasaki-shi, Kanagawa (JP)

(72) Inventors: Inwoong Kim, Allen, TX (US); Olga Vassilieva, Plano, TX (US); Paparao Palacharla, Richardson, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 116 days.

(21) Appl. No.: 13/772,581

(22) Filed: Feb. 21, 2013

(65) Prior Publication Data
US 2014/0233965 A1    Aug. 21, 2014

(51) Int. Cl.
*H04B 10/50*  (2013.01)
*H04B 10/54*  (2013.01)

(52) U.S. Cl.
CPC ...... *H04B 10/5053* (2013.01); *H04B 10/50575* (2013.01); *H04B 10/541* (2013.01)

(58) Field of Classification Search
CPC ................... H04B 10/50572; H04B 10/50575; H04B 10/50577; H04B 10/58; H04B 10/505; H04B 10/5057; H04B 10/5053; H04B 10/541; G02F 1/0123
USPC ................................................. 398/182–201
See application file for complete search history.

(56) References Cited

U.S. PATENT DOCUMENTS

| | | | | |
|---|---|---|---|---|
| 4,893,352 | A * | 1/1990 | Welford | 398/198 |
| 6,334,004 | B1 * | 12/2001 | Ohkuma et al. | 385/2 |
| 6,687,451 | B1 * | 2/2004 | Sikora | 398/187 |
| 6,700,907 | B2 * | 3/2004 | Schneider et al. | 372/26 |
| 7,116,460 | B2 * | 10/2006 | Griffin | G02F 1/0123 359/238 |
| 7,266,306 | B1 * | 9/2007 | Harley et al. | 398/182 |
| 7,272,271 | B2 * | 9/2007 | Kaplan et al. | 385/3 |
| 7,369,290 | B1 * | 5/2008 | Cox et al. | 359/239 |
| 7,463,802 | B2 * | 12/2008 | Witzel | 385/100 |
| 7,555,226 | B2 * | 6/2009 | Tipper | 398/198 |

(Continued)

OTHER PUBLICATIONS

Cho et al , Bias Control for Optical OFDM Transmitters, Jul. 2010, IEEE, vol. 22 No. 14, pp. 1030-1032.*

(Continued)

*Primary Examiner* — Ken Vanderpuye
*Assistant Examiner* — Dibson Sanchez
(74) *Attorney, Agent, or Firm* — Baker Botts L.L.P.

(57) ABSTRACT

A system includes an optical power meter operable to generate an optical power signal corresponding to the optical power of a received output signal generated by an optical IQ-modulator. The system further includes a processor operable to receive the optical power signal and determine, based on a minimization algorithm and the received optical power signal, a first bias voltage to be applied to a first sub-modulator of the optical IQ-modulator and a second bias voltage to be applied to a second sub-modulator of the optical IQ-modulator. The system may also include a peak power meter operable to generate a peak power signal corresponding to the peak power of the received output signal generated by the optical IQ-modulator, wherein the processor is further operable to determine, based on a minimization algorithm and the received peak power signal, a third bias voltage to be applied to a phase shift component of the optical IQ-modulator.

10 Claims, 15 Drawing Sheets

(56) References Cited

U.S. PATENT DOCUMENTS

| | | | | |
|---|---|---|---|---|
| 7,733,193 B2* | 6/2010 | Kershteyn et al. | | 332/103 |
| 7,773,283 B2* | 8/2010 | Tanaka et al. | | 359/237 |
| 7,817,923 B2* | 10/2010 | Akiyama | | G02F 1/0123 398/183 |
| 7,822,348 B2* | 10/2010 | Webb et al. | | 398/198 |
| 7,840,141 B2* | 11/2010 | Tanaka | | G02F 1/0123 398/183 |
| 7,848,659 B2* | 12/2010 | Miura | | G02F 1/0123 398/183 |
| 7,903,981 B2* | 3/2011 | Cho et al. | | 398/198 |
| 7,953,328 B2* | 5/2011 | Tao et al. | | 398/198 |
| 8,019,232 B2* | 9/2011 | Boffi | | H04B 10/505 398/183 |
| 8,095,018 B2* | 1/2012 | Sekine | | G02F 1/0123 398/157 |
| 8,121,492 B2* | 2/2012 | Akiyama et al. | | 398/188 |
| 8,145,069 B2* | 3/2012 | Tanaka et al. | | 398/198 |
| 8,364,038 B2* | 1/2013 | Mizuguchi et al. | | 398/65 |
| 8,457,503 B2* | 6/2013 | Akiyama | | G02F 1/2255 398/188 |
| 8,565,615 B2* | 10/2013 | Nishihara et al. | | 398/183 |
| 8,582,980 B2* | 11/2013 | Nishihara et al. | | 398/188 |
| 8,582,981 B2* | 11/2013 | Akiyama | | H04B 10/50 398/188 |
| 8,600,199 B2* | 12/2013 | Morishita | | 385/3 |
| 8,693,891 B2* | 4/2014 | Nishihara et al. | | 398/195 |
| 8,731,409 B2* | 5/2014 | Akiyama | | H04B 10/5053 398/183 |
| 8,909,067 B2* | 12/2014 | Takeguchi | | G02F 1/0123 398/182 |
| 2004/0028418 A1* | 2/2004 | Kaplan et al. | | 398/188 |
| 2004/0190910 A1* | 9/2004 | Akiyama et al. | | 398/186 |
| 2007/0041735 A1* | 2/2007 | Darcie | | H04B 10/032 398/186 |
| 2007/0047954 A1* | 3/2007 | Mamyshev | | 398/33 |
| 2007/0092262 A1* | 4/2007 | Bozarth et al. | | 398/159 |
| 2007/0122161 A1* | 5/2007 | Charlet et al. | | 398/188 |
| 2007/0212075 A1* | 9/2007 | Yin | | 398/183 |
| 2008/0094123 A1* | 4/2008 | Koh et al. | | 327/513 |
| 2008/0232820 A1* | 9/2008 | Burchfiel | | 398/183 |
| 2009/0041472 A1* | 2/2009 | Kawanishi et al. | | 398/187 |
| 2009/0185810 A1* | 7/2009 | Kaplan | | G02F 1/225 398/184 |
| 2010/0142964 A1* | 6/2010 | Chang | | H04B 10/50575 398/116 |
| 2010/0150576 A1* | 6/2010 | Chung et al. | | 398/188 |
| 2011/0109954 A1* | 5/2011 | Zhou et al. | | 359/279 |
| 2012/0014470 A1* | 1/2012 | Cho et al. | | 375/279 |
| 2012/0155880 A1* | 6/2012 | Nishimoto et al. | | 398/79 |
| 2012/0207483 A1* | 8/2012 | Cui | | H04B 10/5561 398/188 |
| 2012/0288284 A1* | 11/2012 | Yoshida | | H04B 10/5053 398/186 |
| 2012/0301153 A1* | 11/2012 | Takeguchi et al. | | 398/135 |
| 2013/0202315 A1* | 8/2013 | Akiyama | | H04B 10/50 398/182 |
| 2014/0023368 A1* | 1/2014 | Bhandare | | H04J 14/06 398/65 |

OTHER PUBLICATIONS

Yoshida et al, A Study on Automatic Bias Control for Arbitrary Optical Signal Generation by Dual-parallel Mach Zehnder Modulator, Sep. 2010, ECOC, pp. 1-3.*
Schmogrow et al, Real Time Nyquist Pulse Modulation Transmitter Generating Rectangular Shaped Spectra of 112 Gbits 16QAM Signals, Jun. 2011, OSA, pp. 1-2.*
Kawanishi et al, High Extinction Ratio Optical Modulator Using Active Intensity Trimmers, 2005, ECOC, vol. 4 paper Th .6.6, pp. 841-842.*
Kawanishi et al, Study of precise optical modulation using Mach Zehnder interferometers for advanced modulation formats, Sep. 2007, ECOC, pp. 1-2.*
Mohammad Sotoodeh et al., "Modulator bias and optical power control of optical complex E-field modulators," J. of Lightwave Technol., vol. 29, No. 15, Aug. 1, 2011 pp. 2235-2248.
H. Hawakami et al., "Auto bias control technique based on asymmetric bias dithering for optical QPSK modulation," J. of Lightwave Technol., vol. 30, No. 7, Apr. 1, 2012, pp. 962-968.
Pak S. Cho et al., "Closed-loop bias control of optical quadrature modulator," IEEE PTL., vol. 18, No. 21, Nov. 1, 2006, pp. 2209-2211.
Hiroto Kawakami et al., "Auto bias control technique for optical 16-QAM transmitter with asymmetric bias dithering," Optics Express, vol. 19, No. 26, Dec. 12, 2011, Dec. 11, 2011.
Tetsuya Kawanishi et al., "Study of precise optical modulation using Mach-Zehnder interferometers for advanced modulation formats," Ntl. Ins. of Information and Communications Technology, Japan, 33rd European Conference and Exhibition, Sep. 16-20, 2007.
Tetsuya Kawanishi, "Lightwave modulation techniques for advanced modulation formats," Ntl. Ins. of Information and Communications Technology, Japan, Jul. 2010 pp. 35-42.
Christophe Peucheret, "Generation and detection of optical modulation formats," Dep. of Photonics Eng., Tech. Univ. of Denmark, Mar. 26, 2012.

* cited by examiner

US 9,344,194 B2

SYSTEM AND METHOD FOR MONITORING AND CONTROL OF AN OPTICAL MODULATOR FOR AN M-QAM TRANSMITTER

TECHNICAL FIELD OF THE INVENTION

This disclosure relates generally to optical communication networks and more particularly to a system and method for monitoring and control of an optical modulator for an M-QAM transmitter.

BACKGROUND OF THE INVENTION

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. Optical networks often employ modulation schemes to convey information in the optical signals over the optical fibers. Such modulation schemes may increase the amount of information that can be conveyed. For example, in quadrature amplitude modulation (QAM), the information carried by the optical signal may be conveyed by modulating both the amplitude and phase of the carrier wave. QAM signals may be represented using a complex plane with real and imaginary axes on a constellation diagram. The points on the constellation diagram represent symbols carrying information and may be positioned with uniform angular spacing around the origin of the diagram. As the number of points on constellation diagram increases, the amount of information that can be carried per symbol increases. As a result, the overall amount of information that can be conveyed increases.

SUMMARY OF THE INVENTION

According to embodiments of the present disclosure, disadvantages and problems associated with previous systems may be reduced or eliminated.

In certain embodiments, a system includes an optical power meter operable to generate an optical power signal corresponding to the optical power of a received output signal generated by an optical IQ-modulator. The system further includes a processor operable to receive the optical power signal and determine, based on a minimization algorithm and the received optical power signal, a first bias voltage to be applied to a first sub-modulator of the optical IQ-modulator and a second bias voltage to be applied to a second sub-modulator of the optical IQ-modulator.

In certain other embodiments, a system includes a photo detector operable to generate an intensity signal corresponding to a received output signal generated by an optical IQ-modulator. The system further includes a filter operable to generate a filtered intensity signal based on the intensity signal generated by the photo detector and an RF power meter operable to generate an RF power signal corresponding to the filtered intensity signal generated by the filter. The system further includes a processor operable to receive the RF power signal and determine, based on a minimization algorithm and the received optical power signal, a first bias voltage to be applied to a first sub-modulator of the optical IQ-modulator and a second bias voltage to be applied to a second sub-modulator of the optical IQ-modulator.

In certain other embodiments, a system includes a peak power meter operable to generate a peak power signal corresponding to the peak power of a received output signal generated by an optical IQ-modulator. The system further includes a processor operable to receive the peak power signal and determine, based on a minimization algorithm and the received peak power signal, a bias voltage to be applied to a phase shift component of the optical IQ-modulator.

Certain embodiments of the present disclosure may provide one or more technical advantages. For example, a finite extinction ratio (ER) associated with the parallel sub-modulators of an optical IQ-modulator (e.g., parallel Mach-Zehnder modulators (MZMs)), in addition to causing distortion in the M-QAM signal generated by the optical IQ-modulator, may cause increases in the optical power of the output signal and/or the RF power measured for the output signal (e.g., by a photo detector). Certain embodiments of the present disclosure may use minimization algorithms to determine bias voltages to be applied to each of the sub-modulators such that the optical and/or RF power of the output signal are minimized. As a result, distortion in the M-QAM signal generated by the optical IQ-modulator may also be minimized.

As another example, the imprecise application of the application of a phase shift to the quadrature component (Q) of an optical IQ-modulator (e.g., a phase shift amount differing from 90 degrees), in addition to causing distortion in the M-QAM signal generated by the optical IQ-modulator, may cause increases in the peak power the output signal. Certain embodiments of the present disclosure may use minimization algorithms to determine a bias voltage to be applied to a phase shift component of the optical IQ-modulator such that the peak power of the output signal is minimized. As a result, distortion in the M-QAM signal generated by the optical IQ-modulator may also be minimized by reducing crosstalk between two orthogonal components, the in-phase and quadrature components.

Certain embodiments of the present disclosure may include some, all, or none of the above advantages. One or more other technical advantages may be readily apparent to those skilled in the art from the figures, descriptions, and claims included herein.

DETAILED DESCRIPTION OF THE INVENTION

Figure 1:
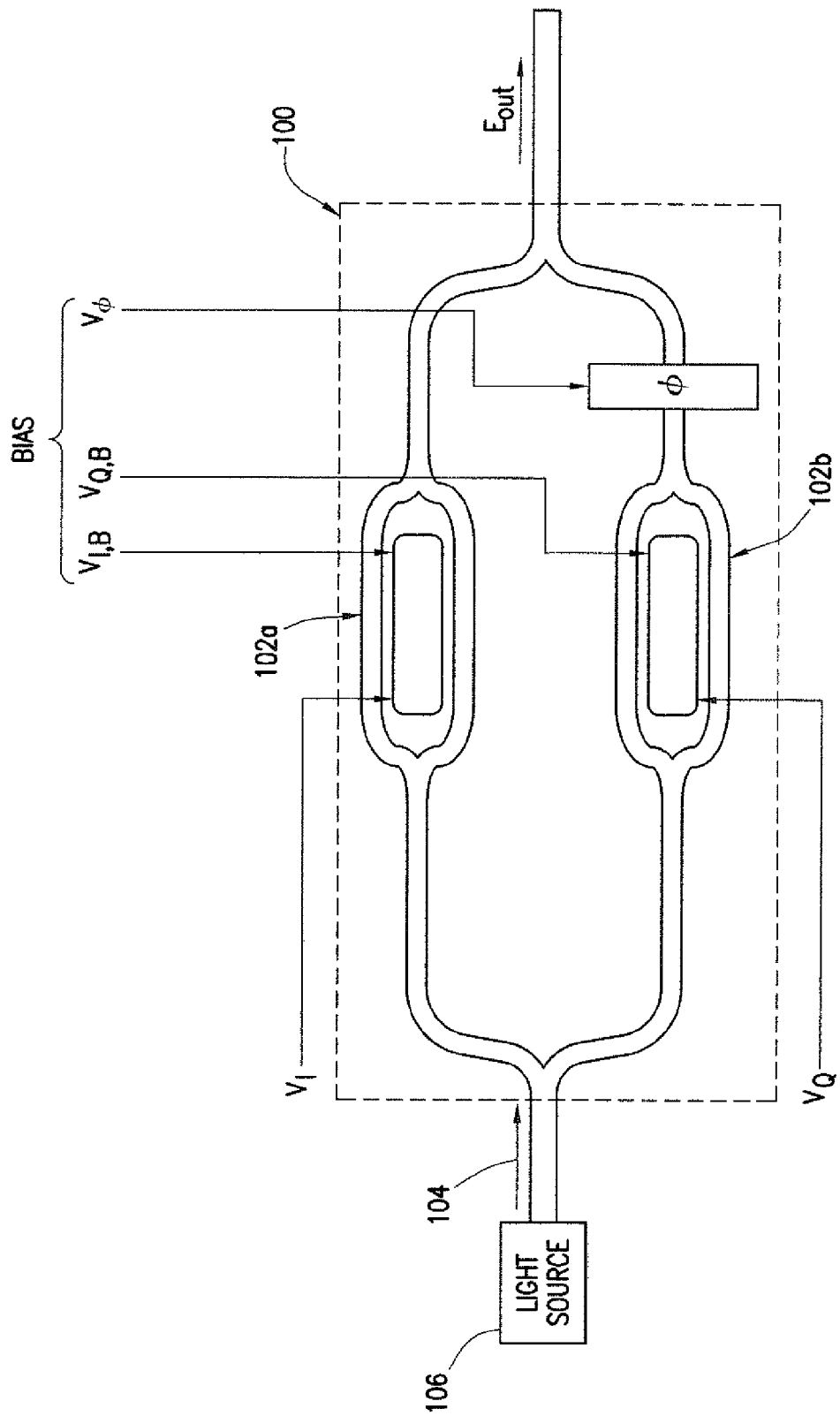
FIG. 1 illustrates an example optical IQ-modulator for use in fiber-optic transmitters, according to certain embodiments of the present disclosure.

FIG. 1 illustrates an example optical IQ-modulator 100 for use in fiber-optic transmitters, according to certain embodiments of the present disclosure. Optical IQ-modulator 100 may include a set of parallel sub-modulators 102a and 102b. A light beam 104 generated by a source 106 (e.g., a continuous wave laser or any other suitable source) may be split between the two sub modulators 102 of optical IQ-modulator 100, and each sub-modulator 102 may be operable to modulate a signal onto the corresponding light beam. One arm of the split light beam 104 may be referred to as the in-phase component (I) (e.g., the portion passing through sub-modulator 102a in FIG. 1), and the other arm of the split light beam 104 may be referred to as the quadrature component (Q) (e.g., the portion passing through sub-modulator 102b in FIG. 1). The in-phase component (I) may be modulated directly by sub-modulator 102a based on an applied driving signal $V_I$, while the quadrature component (Q) may be modulated by sub-modulator 102b based on an applied driving signal $V_Q$ in addition to being phase shifted on amount $\phi$. By independently modulating the in-phase component (I) and the phase-shifted quadrature component (Q) (by controlling $V_I$ and $V_Q$, respectively), M-ary quadrature-amplitude modulation (M-QAM) of the combined output signal (depicted as $E_{out}$ in FIG. 1) can be achieved.

As one example, each of the parallel sub-modulators 102 of optical IQ-modulator 100 may be a Mach-Zehnder modulator (MZM). In such embodiments, optical IQ-modulator 100 may be referred to as a dual parallel Mach-Zehnder modulator (DPMZM). Although it will be assumed throughout the remainder of this description that sub-modulators 102 are each MZMs (for the purpose of simplicity), the present disclosure contemplates that sub-modulators 102 may include any suitable modulators operable to generate signals that, when combined, constitute an M-QAM signal.

In certain embodiments, driving signals $V_I$ and $V_Q$ may be applied to MZMs 102a and 102b, respectively, such that the combined output signal generated by optical IQ-modulator 100 (depicted as $E_{out}$ in FIG. 1) is a 16-QAM optical signal. Although a 16-QAM signal is discussed for example purposes, the principles discussed herein can be applied to an optical transmitter generating any M-QAM signal.

Figure 2:
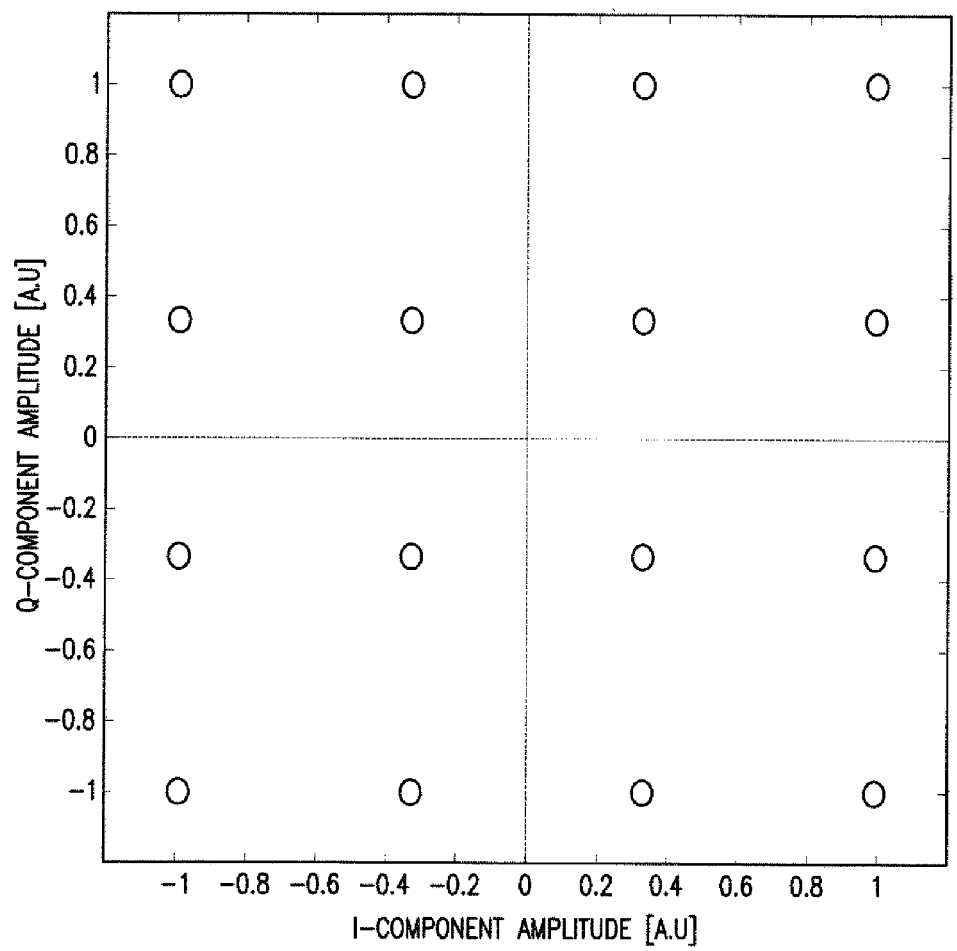
FIG. 2 illustrates an example ideal constellation diagram for a 16-QAM optical signal of the example optical IQ-modulator depicted in FIG. 1, according to certain embodiments of the present disclosure.

FIG. 2 illustrates an example ideal constellation diagram for a 16-QAM optical signal of optical IQ-modulator 100, according to certain embodiments of the present disclosure. The depicted ideal constellation diagram results from the operation of optical IQ-modulator 100 as follows: regular 16-QAM driving signals $V_I$ and $V_Q$ are used to drive MZMs 102a and 102b; no rising filter is applied; the peak-to-peak driving signals ($V_I$ and $V_Q$) are normalized such that the each arm of IQ-modulator was driven in +/−$V_\pi$; linearizer is used to compensate for nonlinearity of MZMs 102a and 102b for $V_I$ and $V_Q$; and MZMs 102a and 102b have an infinite extinction ratio (ER). However, if MZMs 102a and 102b are not ideal (e.g., due to an imbalance in MZMs 102a and 102b), the resulting constellation of the 16-QAM optical signal may be distorted due to the existence of a finite extinction ratio (ER) (as depicted in FIGS. 3-4, below).

Figure 3:
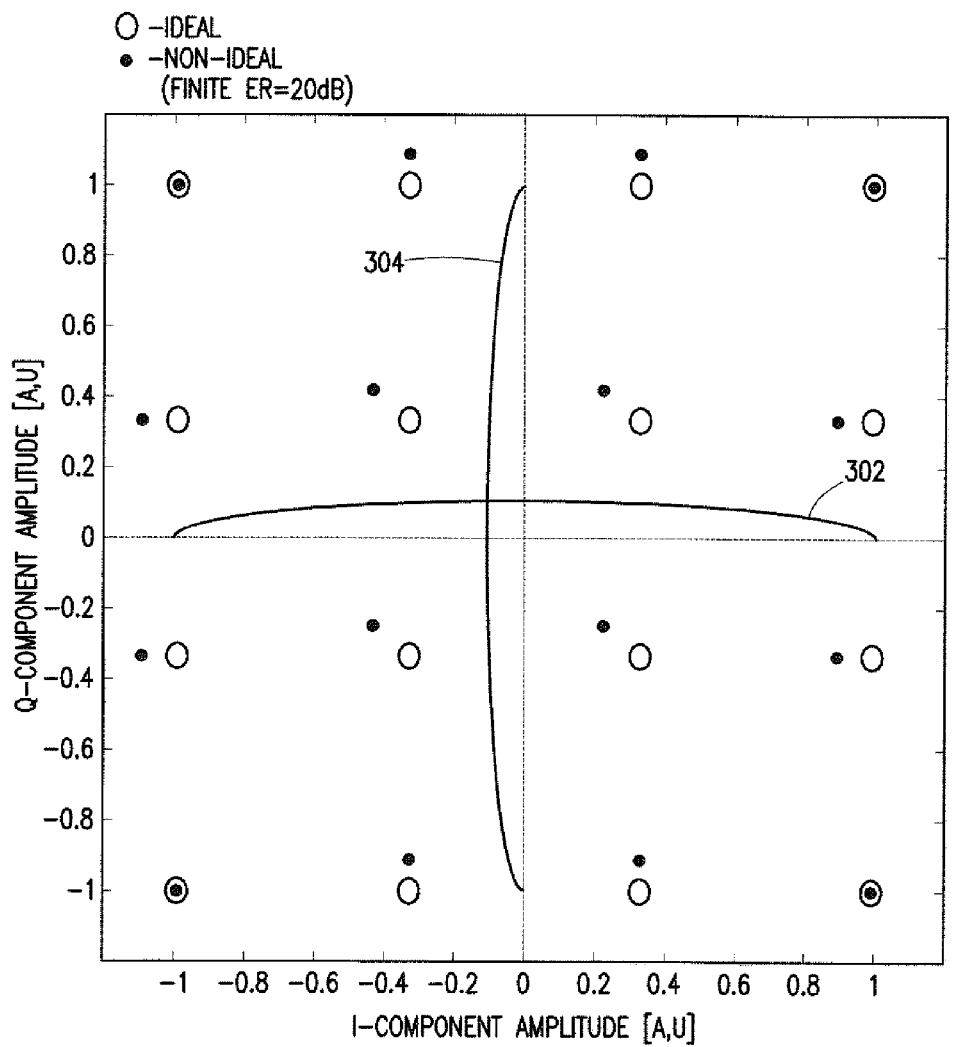
FIG. 3 illustrates an example distorted constellation diagram for a 16-QAM optical signal of the example optical IQ-modulator depicted in FIG. 1, according to certain embodiments of the present disclosure.

FIG. 3 illustrates an example distorted constellation diagram for a 16-QAM optical signal of optical IQ-modulator 100, according to certain embodiments of the present disclosure. The depicted distorted constellation diagram results from the operation of optical IQ-modulator 100 in the same manner as described above with regard to FIG. 2 except that a finite ER of 20 dB exists in each of MZMs 102a and 102b. The non-ideal MZMs 102a and 102b (resulting in the 20 dB finite ER) create orthogonal parasite phase components (shown as cosine terms in the equation for $E_{out}$, below), and the lines labeled 302 and 304 show the traces of E-field of the in-phase (I) and quadrature (Q) components, respectively. The depicted constellation error of 16-QAM signal is non-linear and corresponds to the vector sum of the parasite components.

Figure 4:
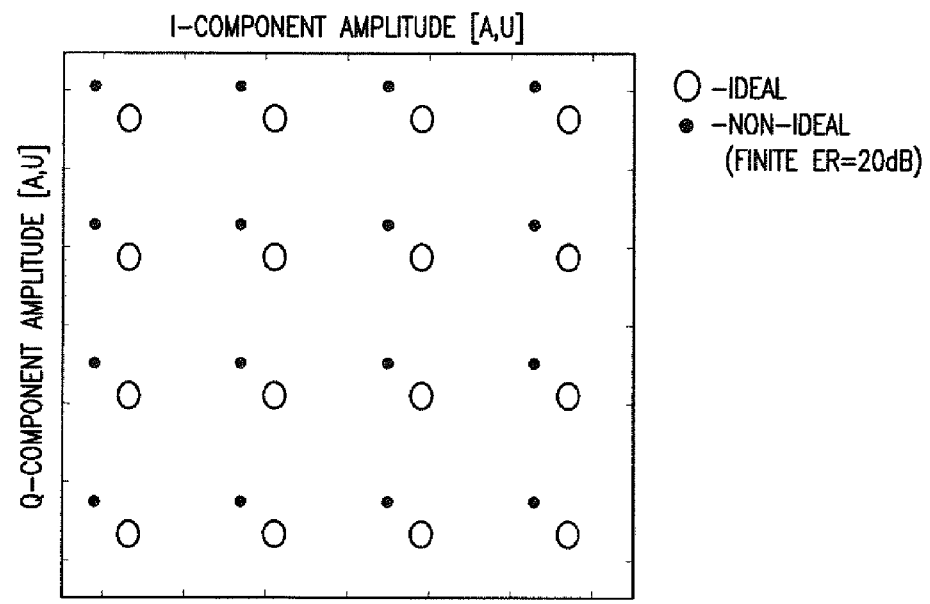
FIG. 4 illustrates an example distorted constellation diagram for a Nyquist 16-QAM optical signal of the example optical IQ-modulator depicted in FIG. 1, according to certain embodiments of the present disclosure.

FIG. 4 illustrates an example distorted constellation diagram for a Nyquist 16-QAM optical signal of optical IQ-modulator 100, according to certain embodiments of the present disclosure. The depicted distorted constellation diagram results from the operation of optical IQ-modulator 100 in the same manner as described above with regard to FIG. 3 except that 10 Gbaud driving signals $V_I$ and $V_Q$ with Nyquist pulse shaping are used to drive MZMs 102a and 102b (as opposed to regular 16-QAM driving signals). As is illustrated, the distortions to the constellation points of the Nyquist 16-QAM signal are more linearly-shifted relative to ideal than are the constellation points of the regular 16-QAM signal depicted in FIG. 3. This is because the peak signal between symbols in Nyquist 16-QAM signal could be larger such that all constellation points were in the linear range of MZMs 102a and 102b and the parasite component in that range was rather uniform (as shown by the four constellation points nearest the origin in FIG. 3).

In order to offset the constellation distortions resulting from the existence of a finite ER (as depicted in FIGS. 3-4, above), bias voltages $V_{I,B}$ and $V_{Q,B}$ may be applied to MZMs 102a, and 102b respectively. In certain embodiments, the bias voltages $V_{I,B}$ and $V_{Q,B}$ may be derived based on the following equation representing the output of optical IQ-modulator 100 (consisting of MZMs 102a and 102b with finite ER):

$$E_{out} = e^{i\omega_o t}\left\{-\sin\left(\frac{V_I + V_{I,B}}{2V_\pi}\pi\right) + i\frac{1}{\sqrt{R_{ext}}}\cos\left(\frac{V_I + V_{I,B}}{2V_\pi}\pi\right) + \right. \quad (1)$$

-continued $$i\left[-\sin\left(\frac{V_Q + V_{Q,B}}{2V_\pi}\pi\right) + i\frac{1}{\sqrt{R_{ext}}}\cos\left(\frac{V_Q + V_{Q,B}}{2V_\pi}\pi\right)\right]\right\}$$

where $e^{i\omega_o t}$ is input optical carrier (i.e., light beam 104), $R_{ext}$ is ER of intensity, $V_\pi$ is the half-wave voltage, $V_I$ is the driving signal of in-phase (I) component, $V_Q$ is the driving signal of quadrature (Q) component, and the subscript B stands for bias. From this, the bias voltages $V_{I,B}$ and $V_{Q,B}$ that null output, when the driving signals $V_I$ and $V_Q$ are nulled, can be expressed as follows:

$$V_{I,Bo} = -\frac{2V_\pi}{\pi}\sin^{-1}\left(\sqrt{1/(1+R_{ext})}\right) \quad (2)$$

$$V_{Q,Bo} = \frac{2V_\pi}{\pi}\sin^{-1}\left(\sqrt{1/(1+R_{ext})}\right)$$

Figure 5:
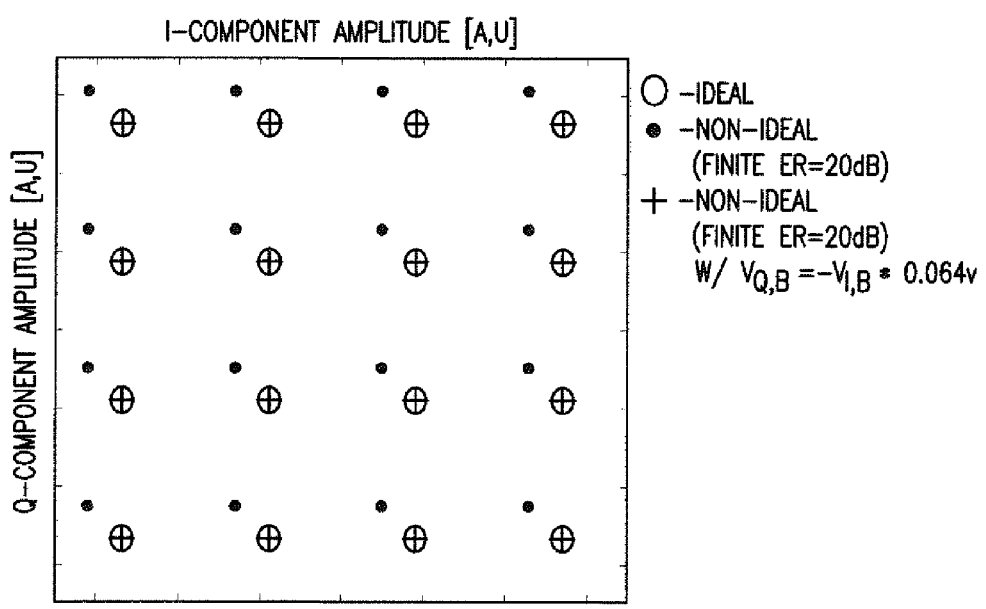
FIG. 5 illustrates the example constellation diagram for the Nyquist 16-QAM optical signal depicted in FIG. 4 with the application of bias voltages, according to certain embodiments of the present disclosure.

Solving this equation based on above-described 20 dB finite ER yields $V_{Q,B} = -V_{I,B} \approx 0.064 V_\pi$. Applying these bias voltages to MZMs 102a and 102b offset the above-described constellation distortions such that constellation error is minimized. For example, FIG. 5 illustrates the example constellation diagram for the Nyquist 16-QAM optical signal depicted in FIG. 4 with the application of bias voltages $V_{Q,B}$ and $V_{I,B}$, according to certain embodiments of the present disclosure.

Figure 6B:
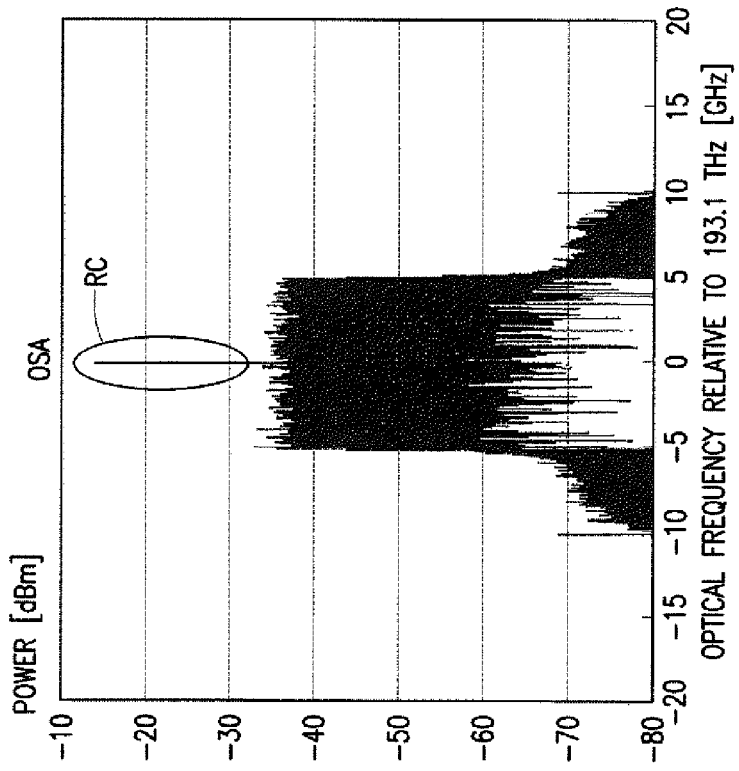
FIGS. 6A-6B illustrate plots of optical power showing the residual carrier (RC) resulting from the existence of a finite extinction ratio (ER)
Figure 6A:
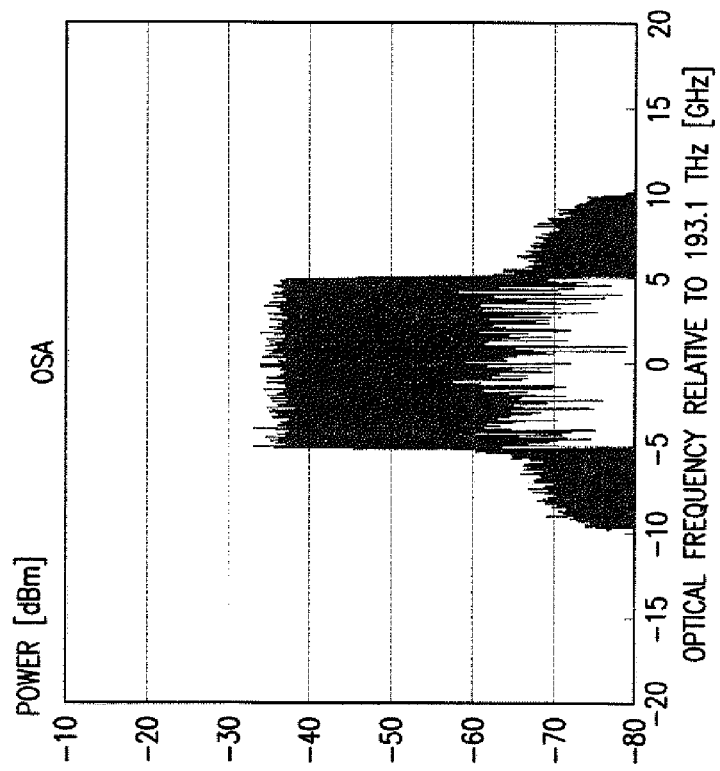

In addition to distorting the constellation of the optical signal, the existence of a finite ER in MZMs 102a and 102b can be observed in the optical spectrum as a residual carrier (RC). FIGS. 6A-6B illustrate plots of optical power showing the RC resulting from the existence of a finite ER. In particular, FIG. 6A corresponds to the operation of optical IQ-modulator 100 such that an ideal Nyquist 16-QAM optical signal is generated (i.e., infinite ER in MZMs 102a and 102b), while FIG. 6B corresponds to the operation of optical IQ-modulator 100 such that the distorted Nyquist 16-QAM optical signal depicted in FIG. 4 is generated (i.e., finite ER=20 dB in MZMs 102a and 102b). As is illustrated in FIG. 6B, a RC is present when there is a finite ER.

Figure 7:
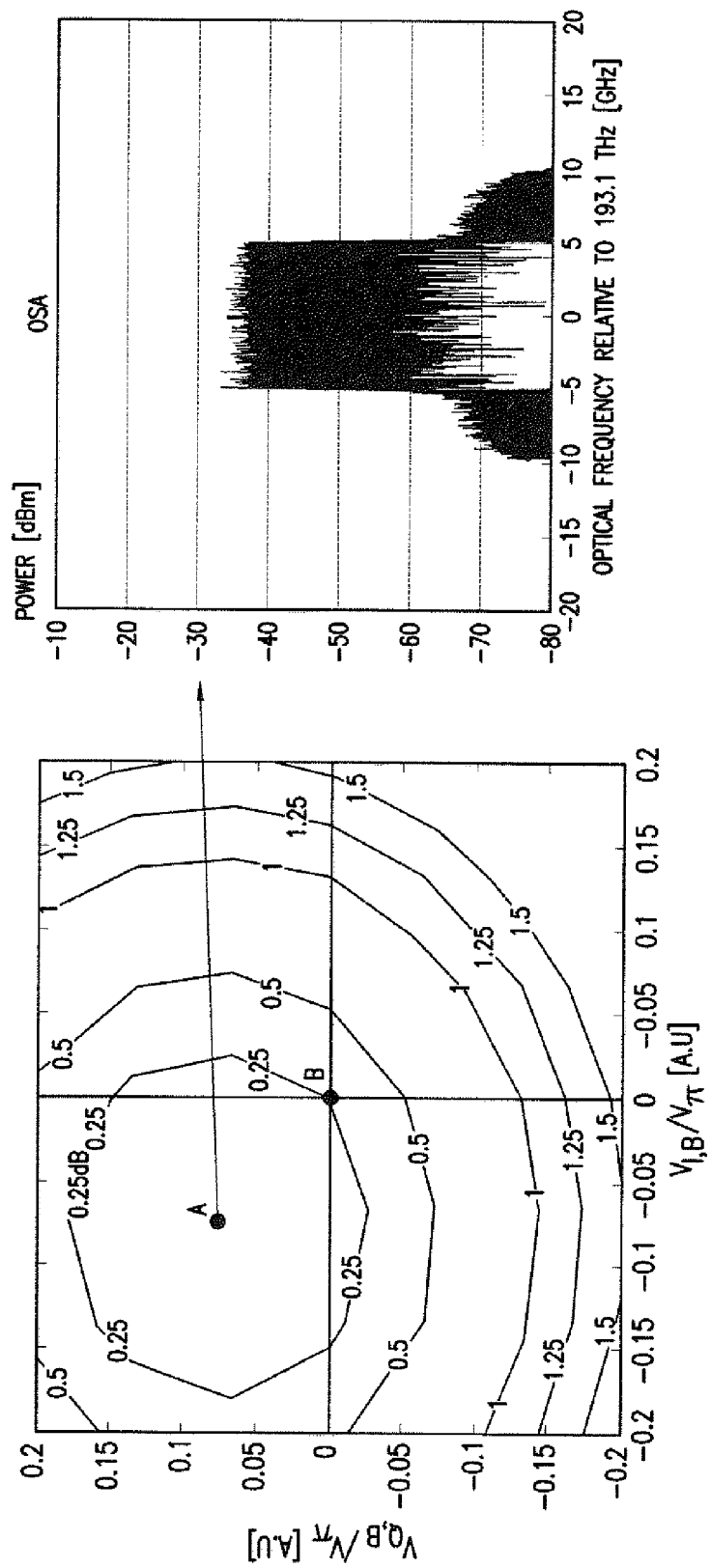
FIG. 7 illustrates a contour plot of the relative dependency of optical power on normalized bias voltages.

If, however, the above-described bias voltages $V_{I,B}$ and $V_{Q,B}$ are applied to MZMs 102a and 102b, respectively, the RC of the Nyquist 16-QAM signal is suppressed. FIG. 7 illustrates a contour plot of the relative dependency of optical power on normalized bias voltages. Point B on the plot corresponds to a situation in which no bias voltages are applied. As a result, the RC depicted in FIG. 6B would be present. Point A on the plot corresponds to a situation in which bias voltages, $V_{Q,B} = -V_{I,B} \approx 0.064 V_\pi$, are applied. As is illustrated by the plot of optical power corresponding to Point A, the applied bias voltages $V_{I,B}$ and $V_{Q,B}$, in addition to offsetting the constellation distortions such that constellation error is minimized (as described above), suppress the RC. As a result, monitoring the average optical power of the signal generated by optical IQ-modulator 100 can be useful in controlling the bias voltages $V_{I,B}$ and $V_{Q,B}$ applied to MZMs 102a and 102b, respectively (as described with regard to FIG. 8, below).

Figure 8:
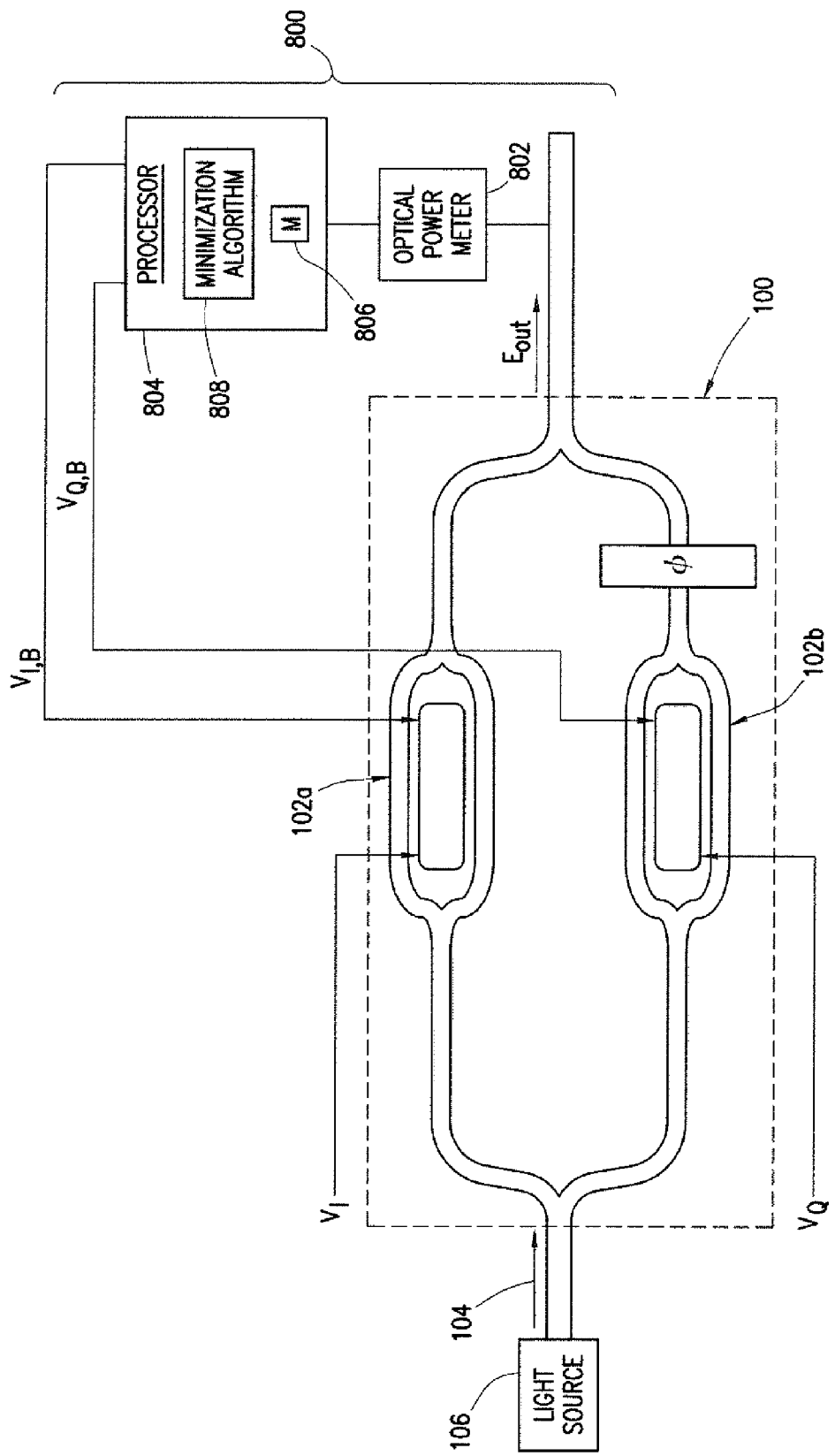
FIG. 8 illustrates an example feedback loop for controlling bias voltages applied the sub-modulators of the optical IQ-modulator depicted in FIG. 1 based on measured optical power, according to certain embodiments of the present disclosure.

FIG. 8 illustrates an example feedback loop 800 for controlling bias voltages $V_{I,B}$ and $V_{Q,B}$ applied to MZMs 102a and 102b of optical IQ-modulator 100 based on measured optical power, according to certain embodiments of the present disclosure. In certain embodiments, feedback loop 800 may operate based on a tapped signal of the output signal of optical IQ-modulator 100. Feedback loop 800 may include an optical power meter 802 configured to measure optical power of the output signal ($E_{out}$) generated by optical IQ-modulator 100. Optical power meter 802 may include any suitable device or combination of devices operable to measure, either on a continuous or periodic basis, the optical power of the signal generated by optical IQ-modulator 100. In certain embodiments, optical power meter 802 may include or operate in conjunction with a photo detector (PD) like that described with regard to FIG. 11, below.

Feedback loop 800 may additionally include a processor 804. Processor 804 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 804 may interpret and/or execute program instructions and/or process data stored in memory 806 to carry out some or all of the operation associated with the setting of bias voltages $V_{I,B}$ and $V_{Q,B}$, as described in further detail below. Memory 806 may be configured in part or whole as application memory, system memory, or both. Memory 806 may include any system, device, or apparatus configured to hold and/or house one or more memory modules. Each memory module may include any system, device or apparatus configured to retain program instructions and/or data for a period of time (e.g., computer-readable media). Memory 806 may be non-transitory. One or more portions or functionality associated with the setting of bias voltages $V_{I,B}$ and $V_{Q,B}$ may be implemented by the execution of instructions resident within memory 106 by processor 104.

In certain embodiments, processor 804 may process the optical power measured by optical power meter 802 by applying a minimization algorithm 808. Minimization algorithm 808 may include any suitable algorithm for minimizing a received signal, such as that generated by optical power meter 802. As just one example, minimization algorithm 808 may include a gradient based minimization algorithm. Based on minimization algorithm 808, processor 804 may determine bias voltages $V_{I,B}$ and $V_{Q,B}$ to be applied to MZMs 102a and 102b, respectively (i.e., bias voltages $V_{I,B}$ and $V_{Q,B}$ that minimize the measured optical power). As a result, the value of bias voltages $V_{I,B}$ and $V_{Q,B}$ may be updated on a continuous or periodic basis such that the constellation error resulting from finite ER may be minimized.

Figure 9A:
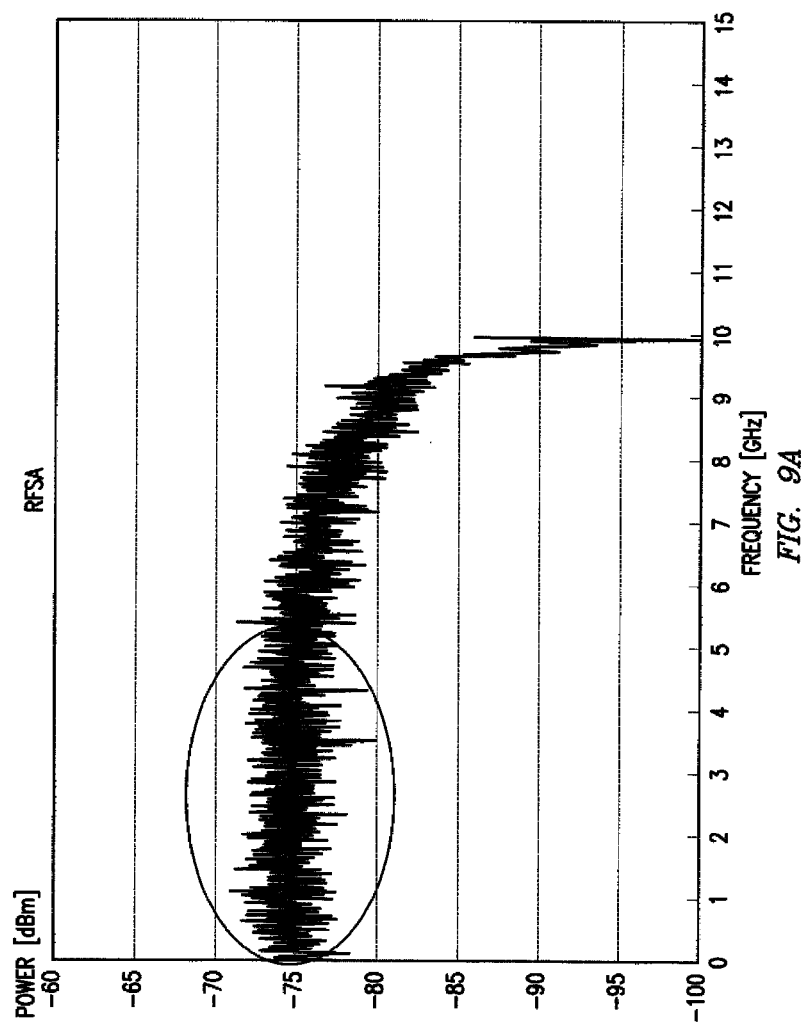
FIGS. 9A-9B illustrate plots of RF power showing an increase in RF power resulting from the existence of a finite extinction ratio (ER)
Figure 9B:
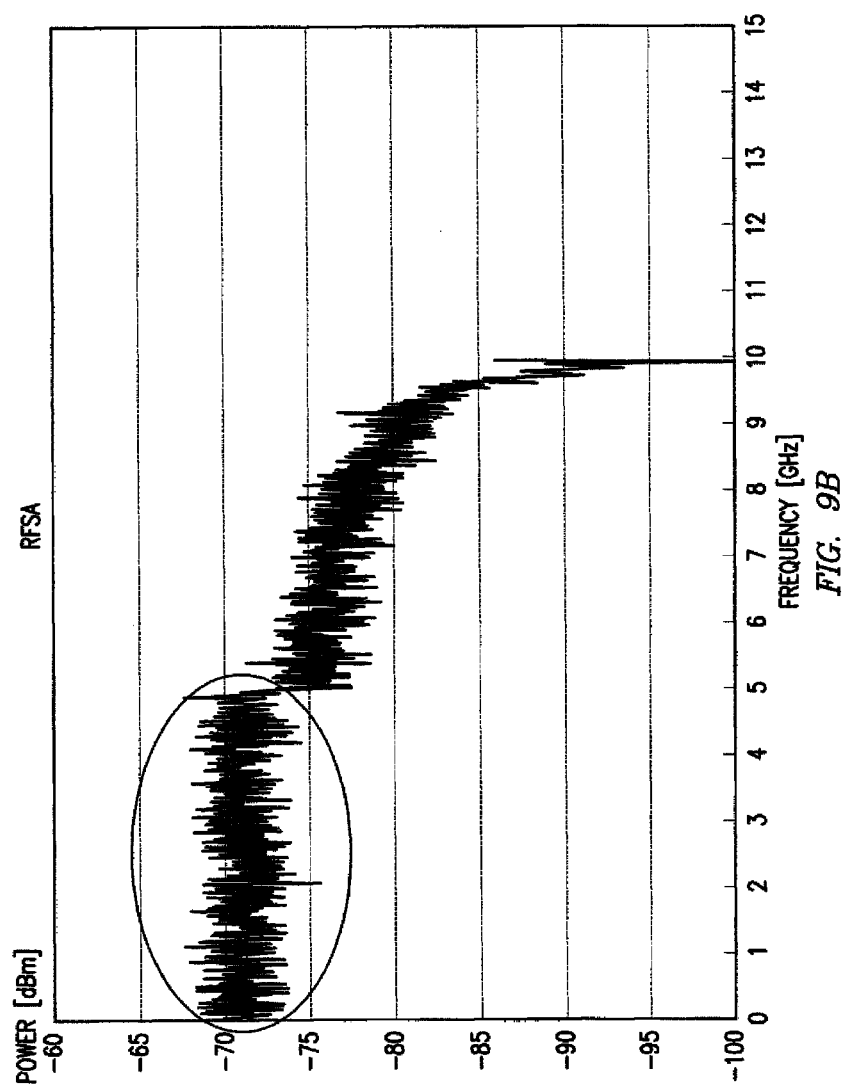

In addition to distorting the constellation of the optical signal and causing a RC to be present in the optical spectrum (as described above), the existence of a finite ER in MZMs 102a and 102b can also be observed as an increase in RF power. FIGS. 9A-9B illustrate plots of RF power showing an increase in RF power resulting from the existence of a finite ER. In particular, FIG. 9A corresponds to the operation of optical IQ-modulator 100 such that an ideal Nyquist 16-QAM optical signal is generated (i.e., infinite ER in MZMs 102a and 102b), while FIG. 9B corresponds to the operation of optical IQ-modulator 100 such that the distorted Nyquist 16-QAM optical signal depicted in FIG. 4 is generated (i.e., finite ER=20 dB in MZMs 102a and 102b). As is illustrated by the circled portions of FIGS. 9A and 9B, the beating between the RC and Nyquist 16-QAM signal contributes to the increased RF power in the frequency range below half of the baud rate compared to that of the ideal Nyquist 16-QAM signal.

Figure 10:
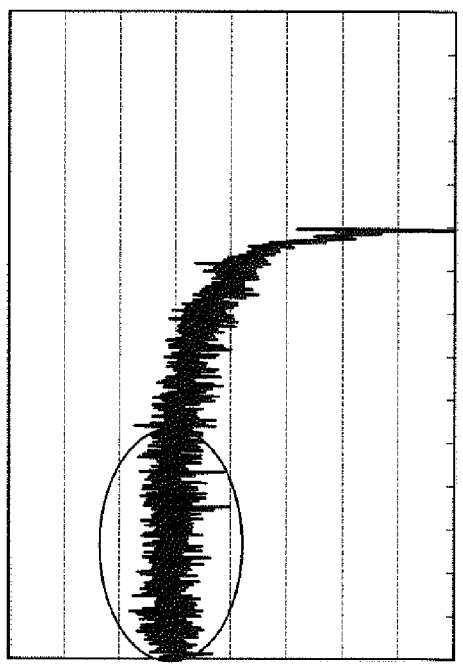
FIG. 10 illustrates a contour plot of the relative dependency of RF power on normalized bias voltages.
Figure 10:
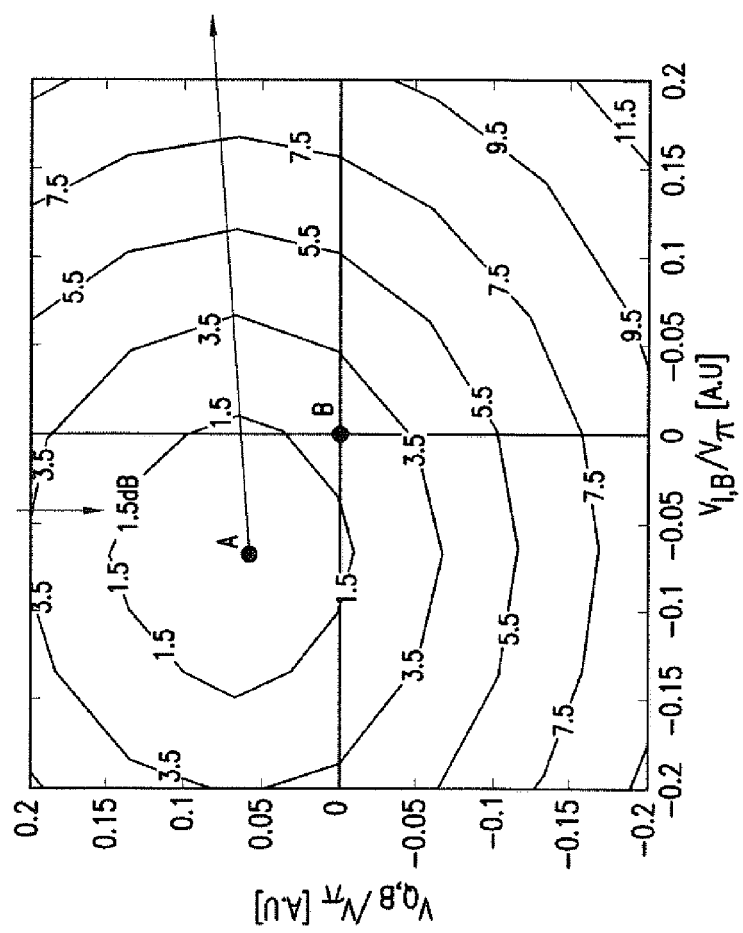

If, however, the above-described bias voltages $V_{I,B}$ and $V_{Q,B}$ are applied to MZMs 102a and 102b, respectively, the increase in RF power of the Nyquist 16-QAM signal can be eliminated. FIG. 10 illustrates a contour plot of the relative dependency of RF power on normalized bias voltages. Point B on the plot corresponds to a situation in which no bias voltages are applied. As a result, the increased RF power depicted in FIG. 9B would be present. Point A on the plot corresponds to a situation in which bias voltages, $V_{Q,B} = -V_{I,B} \approx 0.064 V_\pi$, are applied. As is illustrated by the plot of RF power corresponding to Point A, the applied bias voltages $V_{I,B}$ and $V_{Q,B}$, in addition to offsetting the constellation distortions such that constellation error is minimized (as described above), achieve the lowest RF power (i.e., there is no RF power increase). As a result, monitoring the RF power of the signal generated by optical IQ-modulator 100 can be useful in controlling the bias voltages $V_{I,B}$ and $V_{Q,B}$ applied to MZMs 102a and 102b, respectively (as described with regard to FIG. 11, below).

Figure 11:
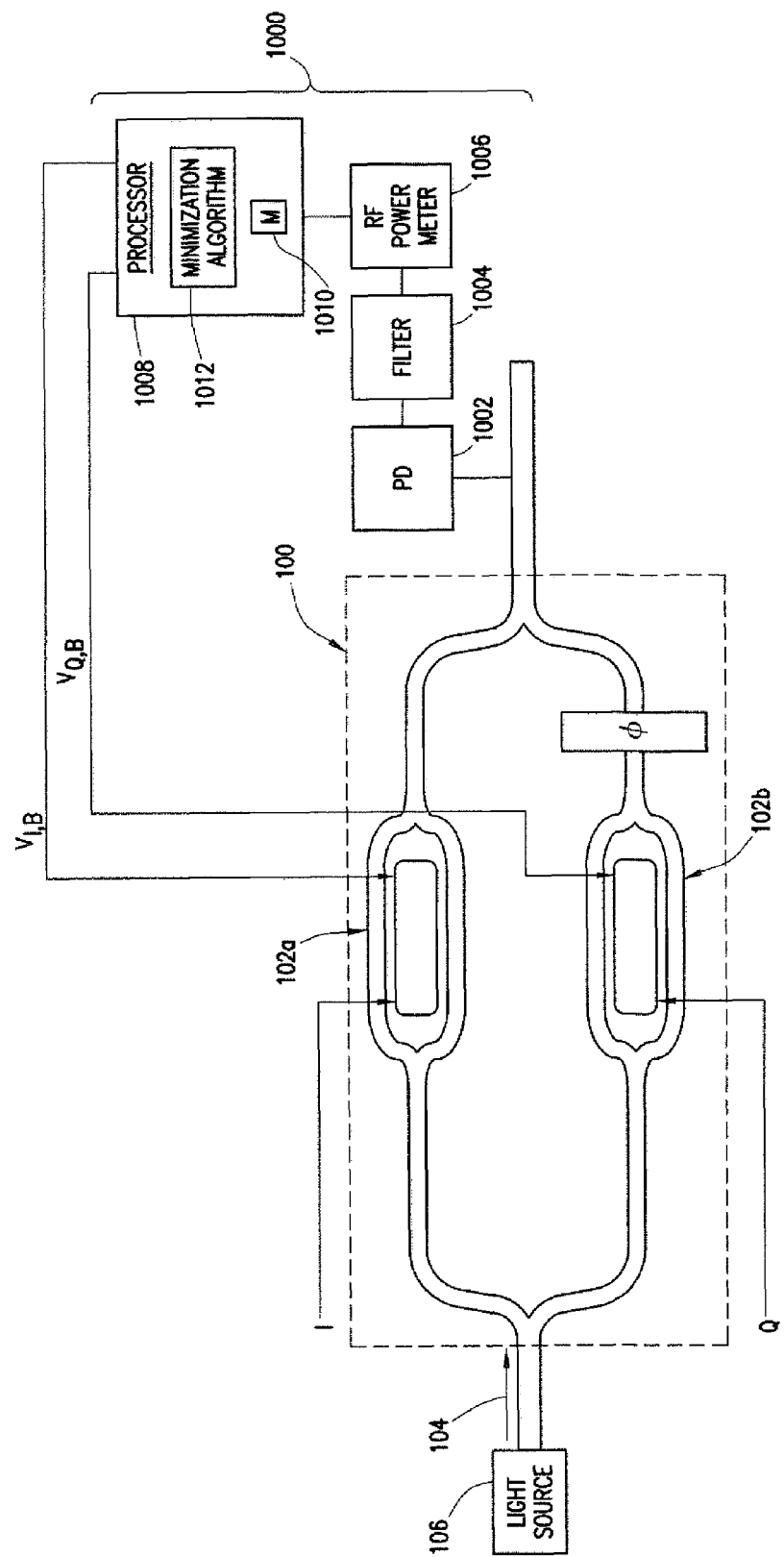
FIG. 11 illustrates an example feedback loop for controlling bias voltages applied to the sub-modulators of the optical IQ-modulator depicted in FIG. 1 based on measured RF power, according to certain embodiments of the present disclosure.

FIG. 11 illustrates an example feedback loop 1000 for controlling bias voltages $V_{I,B}$ and $V_{Q,B}$ applied to MZMs 102a and 102b of optical IQ-modulator 100 based on measured RF power, according to certain embodiments of the present disclosure. In certain embodiments, feedback loop 1000 may operate based on a tapped signal of the output signal of optical IQ-modulator 100. Feedback loop 1000 may include a photo detector (PD) 1002, which may be any system, device or apparatus configured to detect an intensity of the output signal generated by optical IQ-modulator 100 and convert such detected intensity into an electrical signal indicative of such intensity. Feedback loop 1000 may additionally include a filter 1004 operable to filter the signal generated by PD 1002. For example, filter 1004 may include a low pass filter having a cut off frequency smaller than one half of the baud rate. As another example, filter 1004 may include a band pass filter having a center frequency near or smaller than one half of the baud rate. The filtered signal may be communicated to a RF power meter 1006, may include any suitable device or combination of devices operable to measure, either on a continuous or periodic basis, the RF power of the filtered signal generated by PD 1002.

Feedback loop 1000 may additionally include a processor 1008, which may be substantially similar to processor 804 described above with regard to FIG. 8. Processor 1008 may include a memory 1010, which may be substantially similar to memory 806 described above with regard to FIG. 8.

In certain embodiments, processor 1008 may process the RF power measured by RF power meter 1006 by applying a minimization algorithm 1012. Minimization algorithm 1012 may include any suitable algorithm for minimizing a received signal, such as that generated by RF power meter 1006. As just one example, minimization algorithm 1012 may include a gradient based minimization algorithm. Based on minimization algorithm 1012, processor 1008 may determine bias voltages $V_{I,B}$ and $V_{Q,B}$ to be applied to MZMs 102a and 102b, respectively (i.e., bias voltages $V_{I,B}$ and $V_{Q,B}$ that minimize the RF power). As a result, the value of bias voltages $V_{I,B}$ and $V_{Q,B}$ may be updated on a continuous or periodic basis such that the constellation error resulting from finite ER may be minimized.

Figure 12:
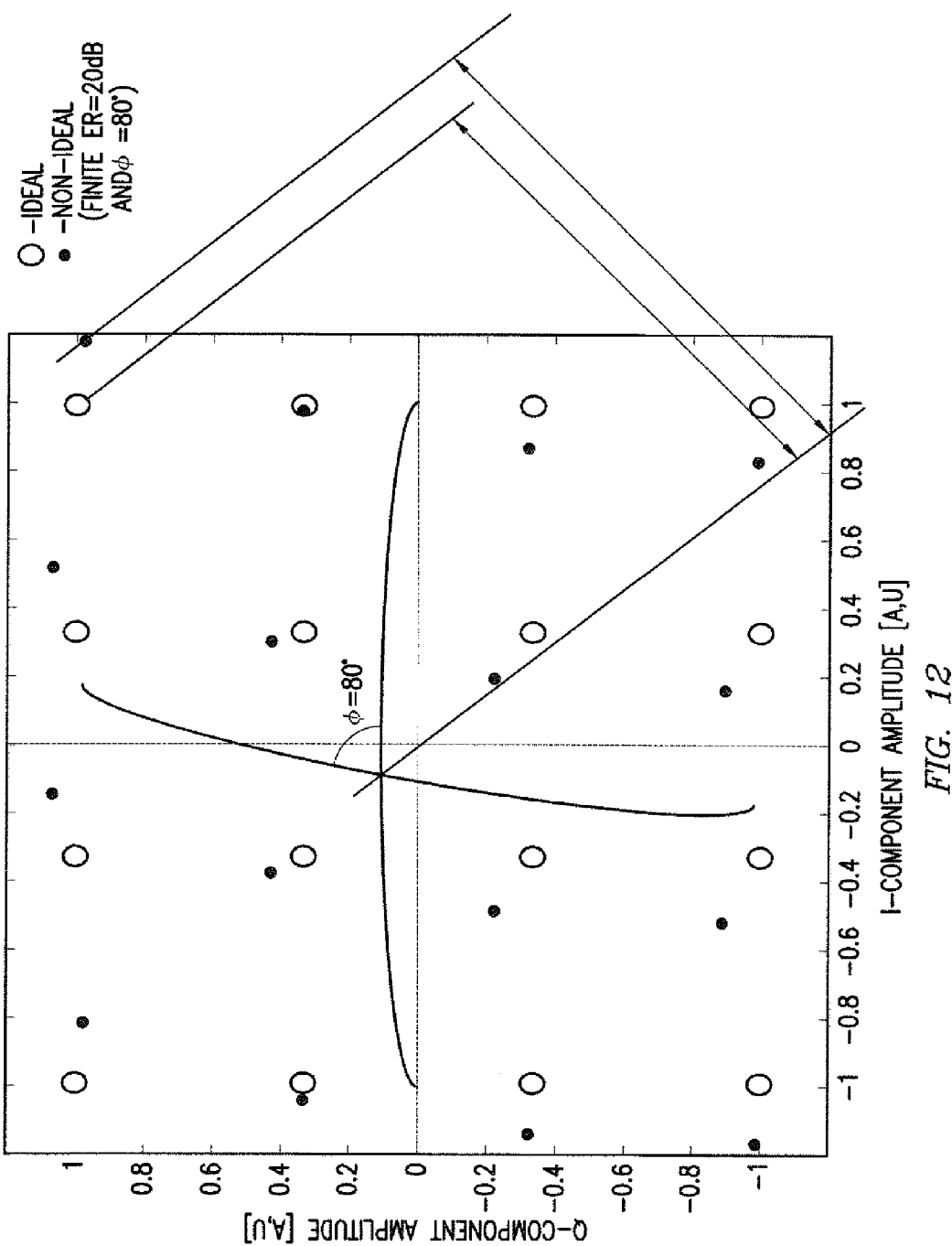
FIG. 12 illustrates an example distorted constellation diagram for a 16-QAM optical signal of the optical IQ-modulator depicted in FIG. 1, according to certain embodiments of the present disclosure.

In addition to the above-discussed constellation distortions resulting from the existence of a finite ER, constellation distortions may also result from the application of an imprecise phase shift φ to the quadrature component (Q). FIG. 12 illustrates an example distorted constellation diagram for a 16-QAM optical signal of optical IQ-modulator 100, according to certain embodiments of the present disclosure. The depicted distorted constellation diagram results from the operation of optical IQ-modulator 100 in the same manner as described above with regard to FIG. 2 except that (1) a finite ER of 20 dB existed in each of MZMs 102a and 102b, and (2) the phase shift φ was 80 degrees rather than 90 degrees. As is illustrated by the lines between the origin of the plot and the upper right constellation point, the peak amplitude of the field is increased relative to the ideal case. This increase is due to interference (crosstalk) between the I and Q channels. In other words, variations in the phase shift φ can cause interference, resulting in increased peak power of the output signal.

Figure 13A:
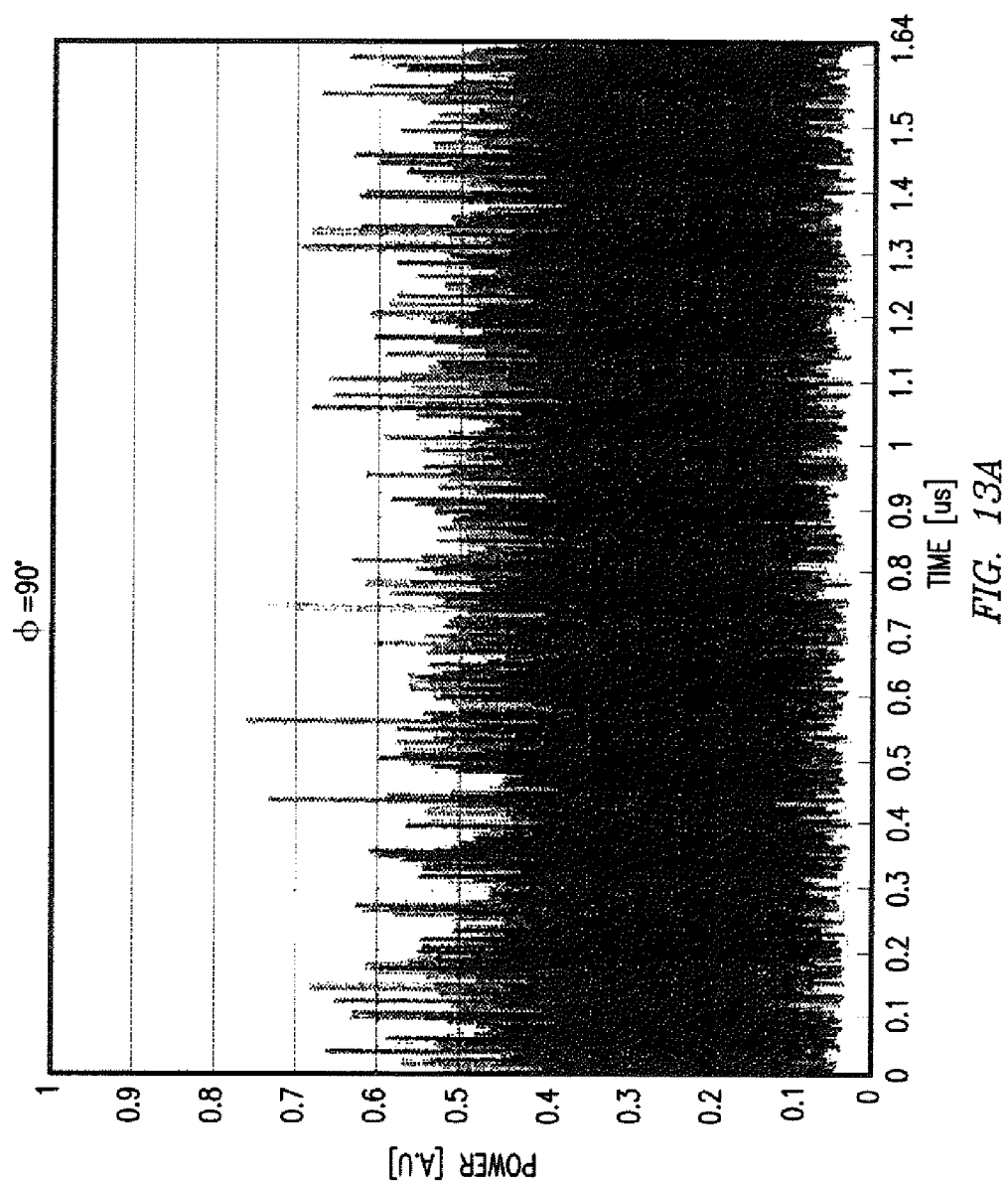
FIGS. 13A-13B illustrate time domain plots of peak power resulting from variations in phase shift.
Figure 13B:
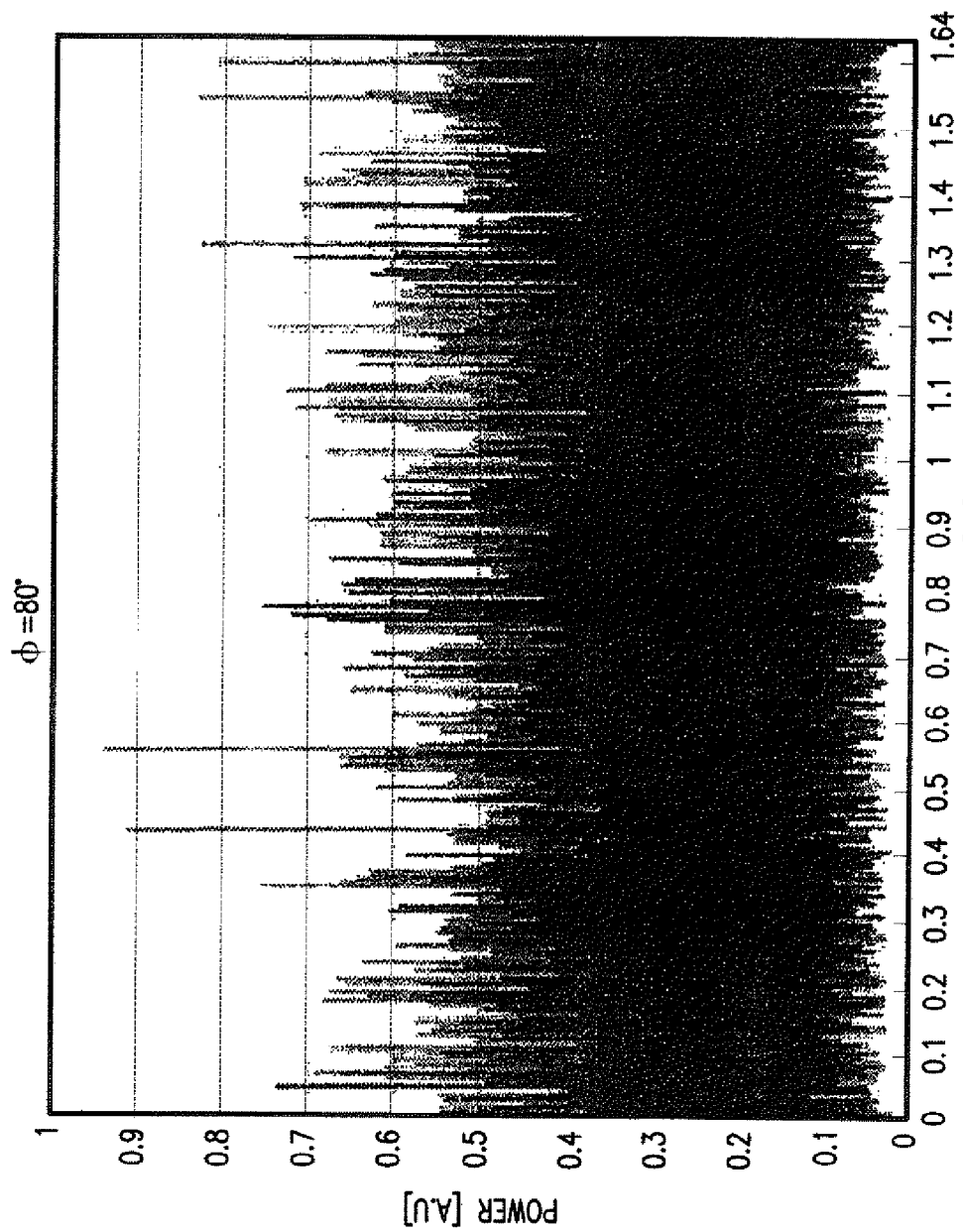

FIGS. 13A-13B illustrate time domain plots of peak power resulting from variations in phase shift φ. In particular, FIG. 13A illustrates a time domain plot of a Nyquist 16-QAM optical signal generated by optical IQ-modulator 100 with an ideal phase shift φ (90 degrees) being applied. FIG. 13B illustrates a time domain plot of a Nyquist 16-QAM optical signal generated by optical IQ-modulator 100 with a non-ideal phase shift φ (80 degrees) being applied. As is illustrated in FIG. 11B, peak optical power increases with the error in phase shift φ.

If, however, a bias voltage $V_\phi$ is applied such that the phase error is reduced or eliminated, a corresponding drop in peak optical power will result. As a result, monitoring the peak optical power of the signal generated by optical IQ-modulator 100 can be useful in controlling the bias voltage $V_\phi$ applied to the phase shift component of optical IQ-modulator 100 (as described with regard to FIG. 13, below).

Figure 14:
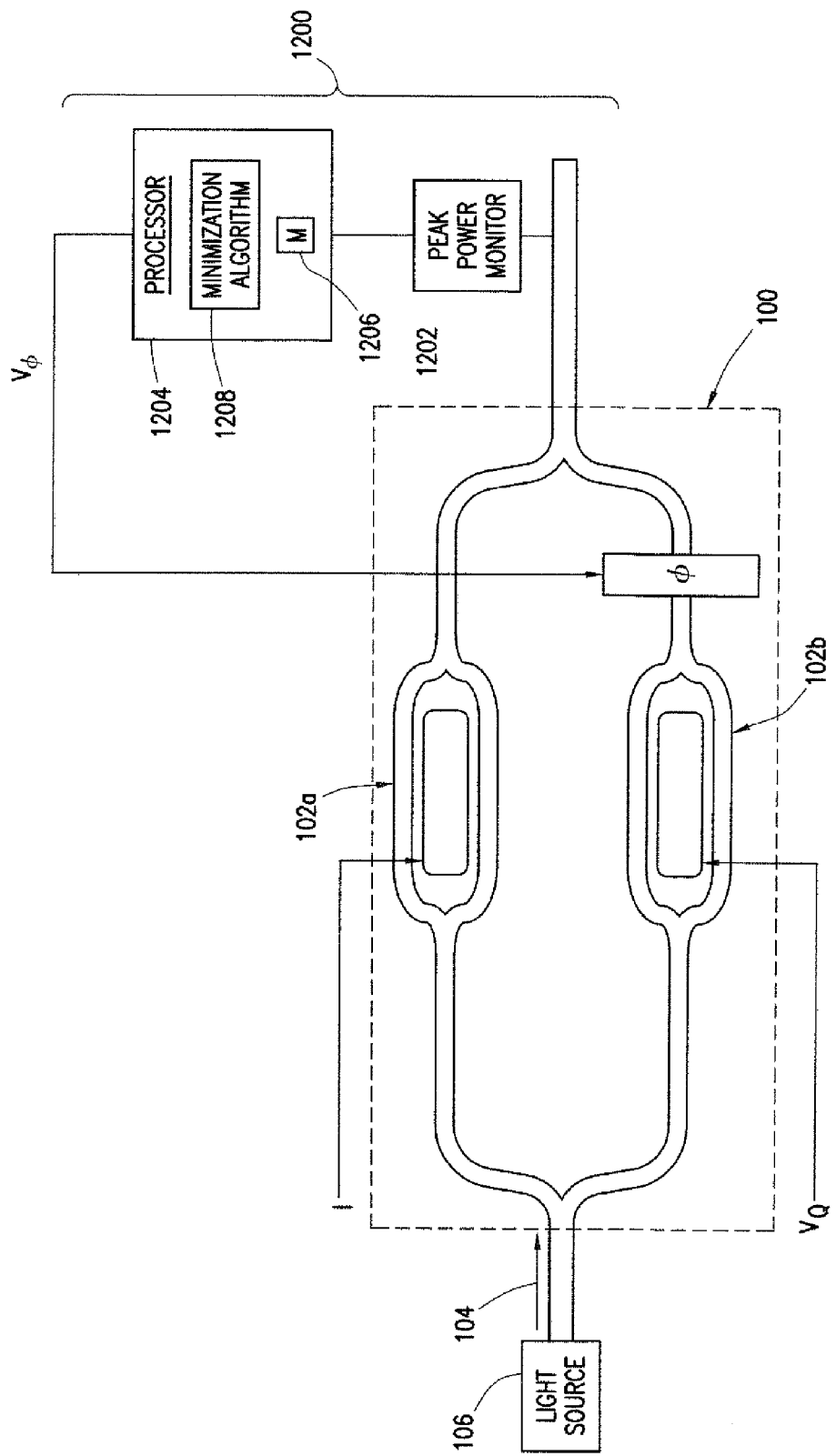
FIG. 14 illustrates an example feedback loop for controlling the bias voltage applied to the phase shift component of the optical IQ-modulator depicted in FIG. 1 based on measured peak power, according to certain embodiments of the present disclosure.

FIG. 14 illustrates an example feedback loop 1200 for controlling the bias voltage $V_\phi$ applied to the phase shift component of optical IQ-modulator 100 based on measured peak power, according to certain embodiments of the present disclosure. In certain embodiments, feedback loop 1200 may operate based on a tapped signal of the output signal of optical IQ-modulator 100. Feedback loop 1200 may include a peak power meter 1202 configured to measure the peak power of the output signal ($E_{out}$) generated by optical IQ-modulator 100. Peak power meter 1202 may include any suitable device or combination of devices operable to measure, either on a continuous or periodic basis, the peak power of the signal generated by optical IQ-modulator 100. In certain embodiments, peak power meter 1202 may include or operate in conjunction with a photo detector (PD) like that described with regard to FIG. 11, above.

Feedback loop 1200 may additionally include a processor 1204, which may be substantially similar to processor 804 described above with regard to FIG. 8. Processor 1204 may include a memory 1206, which may be substantially similar to memory 806 described above with regard to FIG. 8.

In certain embodiments, processor 1404 may process the peak power measured by peak power meter 1402 by applying a minimization algorithm 1408. Minimization algorithm 1208 may include any suitable algorithm for minimizing a received signal, such as that generated by peak power meter 1402. Based on minimization algorithm 1408, processor 1404 may determine a bias voltage $V_\phi$ to be applied to the phase shift component of optical IQ-modulator 100. As a result, the value of bias voltage $V_\phi$ may be updated on a continuous or periodic basis such that the constellation error resulting from the imprecise phase shift φ being applied to the quadrature component (Q).

Although the present disclosure has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims. Moreover, although the feedback loops 800, 1000, and 1200 have been separately described, the present disclosure contemplates one or more of feedback loops 800, 1100, and 1400 being implemented together.

What is claimed is:

1. A system, comprising:
a photo detector operable to generate an intensity signal corresponding to an output signal generated by an optical IQ-modulator, the output signal being a Nyquist M-ary quadrature amplitude modulation (M-QAM) optical signal;
a filter operable to generate a filtered intensity signal based on the intensity signal generated by the photo detector;
an RF power meter operable to measure the filtered intensity signal generated by the filter; and
a processor operable to:
determine, from the measured filtered intensity signal, an increased RF power in a frequency range below half of the baud rate of the output signal in comparison to the RF power in a frequency range above half of the baud rate of the output signal;
determine, based on a minimization algorithm and the determination of the increased RF power in a frequency range below half of the baud rate of the output signal in comparison to the RF power in a frequency range above half of the baud rate of the output signal, a first bias voltage to be applied to a first sub-modulator of the optical IQ-modulator and a second bias voltage to be applied to a second sub-modulator of the optical IQ-modulator, wherein the first bias voltage and the second bias voltage are continuously updated based on the increased RF power to minimize distortions in the output signal resulting from a finite extinction ratio.

2. The system of claim 1, wherein the first and second sub-modulators are each Mach-Zehnder modulators.

3. The system of claim 1, wherein the minimization algorithm is a gradient based minimization algorithm.

4. The system of claim 1, further comprising a peak power meter operable to generate a peak power signal corresponding to the peak power of the output signal generated by the optical IQ-modulator, wherein the processor is further operable to determine, based on a minimization algorithm and the peak power signal, a third bias voltage to be applied to a phase shift component of the optical IQ-modulator.

5. The system of claim 1, wherein the filter is a low pass filter having a cut off frequency less than one half of a baud rate associated with the output signal.

6. The system of claim 1, wherein the filter is a band pass filter having a center frequency equal to or less than one half of a baud rate associated with the output signal.

7. A method, comprising:
generating an intensity signal corresponding to an output signal generated by an optical IQ-modulator, the output signal being a Nyquist M-ary quadrature amplitude modulation (M-QAM) optical signal;
filtering the intensity signal to generate a filtered intensity signal;
measuring the filtered intensity signal to determine an increased RF power in a frequency range below half of the baud rate of the output signal in comparison to the RF power in a frequency range above half of the baud rate of the output signal;
determining, based on a minimization algorithm and the determination of the increased RF power in a frequency range below half of the baud rate of the output signal in comparison to the RF power in a frequency range above half of the baud rate of the output signal, a first bias voltage to be applied to a first sub-modulator of the optical IQ-modulator and a second bias voltage to be applied to a second sub-modulator of the optical IQ-modulator, wherein the first bias voltage and the second bias voltage are continuously updated based on the increased RF power to minimize distortions in the output signal resulting from a finite extinction ratio.

8. The method of claim 7, further comprising:
generating a peak power signal corresponding to the peak power of the output signal generated by the optical IQ-modulator; and
determining, based on a minimization algorithm and the peak power signal, a third bias voltage to be applied to a phase shift component of the optical IQ-modulator.

9. The method of claim 7, wherein the intensity signal is filtered based on a low pass filter having a cut off frequency less than one half of a baud rate associated with the output signal.

10. The method of claim 7, wherein the intensity signal is filtered based on a band pass filter having a center frequency equal to or less than one half of a baud rate associated with the output signal.

* * * * *